(12) United States Patent
Oetken et al.

(10) Patent No.: US 11,961,984 B2
(45) Date of Patent: Apr. 16, 2024

(54) SUBSYSTEM THERMAL TRANSFER FOR WORKING MACHINE

(71) Applicant: Caterpillar Paving Products Inc., Brooklyn Park, MN (US)

(72) Inventors: Nicholas A. Oetken, Brooklyn Park, MN (US); Cary M Bryant, Plymouth, MN (US); Tyler S. Burger, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 191 days.

(21) Appl. No.: 17/481,782

(22) Filed: Sep. 22, 2021

(65) Prior Publication Data
US 2023/0091591 A1    Mar. 23, 2023

(51) Int. Cl.
| | |
|---|---|
| *H01M 10/6568* | (2014.01) |
| *E02F 9/20* | (2006.01) |
| *H01M 10/613* | (2014.01) |
| *H01M 10/625* | (2014.01) |

(52) U.S. Cl.
CPC ....... *H01M 10/6568* (2015.04); *E02F 9/2091* (2013.01); *H01M 10/613* (2015.04); *H01M 10/625* (2015.04)

(58) Field of Classification Search
CPC ........... H01M 10/6568; H01M 10/613; H01M 10/625; E02F 9/2091
See application file for complete search history.

(56) References Cited

U.S. PATENT DOCUMENTS

| | | | |
|---|---|---|---|
| 9,065,103 B2 | 6/2015 | Straubel et al. | |
| 10,522,879 B2 | 12/2019 | Zacher | |
| 10,857,887 B2 | 12/2020 | Epstein et al. | |
| 2016/0134001 A1* | 5/2016 | Lindholm | H01M 10/613 299/29 |
| 2017/0088007 A1* | 3/2017 | Melendez | B60L 53/302 |
| 2017/0088008 A1* | 3/2017 | Melendez | B60L 58/21 |
| 2019/0341659 A1* | 11/2019 | Terwilliger | H01M 10/625 |
| 2020/0339010 A1* | 10/2020 | Villanueva | B64D 27/24 |
| 2021/0062471 A1 | 3/2021 | Kaneda et al. | |
| 2021/0066767 A1* | 3/2021 | Gao | H01M 50/209 |

FOREIGN PATENT DOCUMENTS

| | | |
|---|---|---|
| CN | 106808999 | 10/2019 |
| JP | 5155112 | 12/2012 |

* cited by examiner

*Primary Examiner* — Stewart A Fraser
(74) *Attorney, Agent, or Firm* — David L. Buck; Schwegman Lundberg & Woessner, P.A.

(57) ABSTRACT

A working machine includes an auxiliary system carried by the working machine, one or more batteries and an onboard thermal transfer system. The one or more batteries power an electrical system of the working machine. The onboard thermal transfer system utilizes a coolant configured to remove at least a portion of heat generated by the one or more batteries during charging or discharging of the one or more batteries and using the coolant heated by the thermal transfer system to heat the auxiliary system.

14 Claims, 5 Drawing Sheets

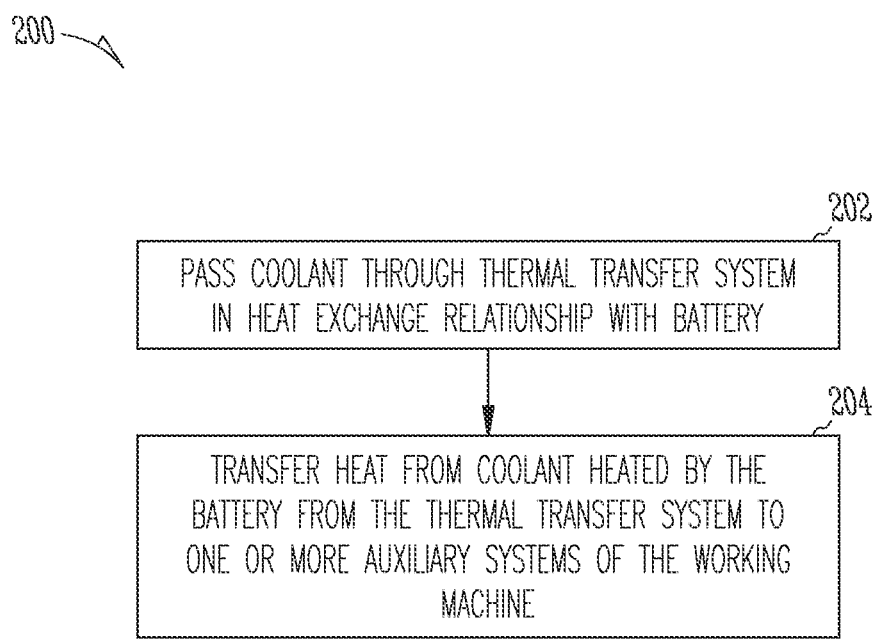

SUBSYSTEM THERMAL TRANSFER FOR WORKING MACHINE

TECHNICAL FIELD

The present application relates generally to working machines. More particularly, the present application relates to thermal transfer techniques to reduce heat generated in charging or discharging of batteries of working machines.

BACKGROUND

Working machines such as paving equipment, earth moving equipment and mining equipment are used to perform various heavy duty tasks. Paving equipment includes various machines that are used to remove, grind, apply, spread and compact paving material. These paving machines are regularly used in the construction of roads, parking lots and other areas where a smooth durable surface is required for cars, trucks and other vehicles to travel.

Working machines must be powered including during operation. Increasingly, batteries have been utilized to power motive operation of working machines in addition to powering auxiliary equipment and machine electrical systems.

Charging or discharging (especially rapid charging) of batteries of working machines can create excess heat due to inefficiencies such as resistance. This excess heat may damage cells of the batteries, which can reduce the overall operational life of the batteries.

Transportation vehicles powered by batteries such as those discussed in U.S. Pat. Nos. 10,857,887 and 9,065,103 have developed systems that address heat generated by rapid charging of batteries. These patents utilize offboard temperature management systems which supply a heat exchange fluid (a coolant) to the battery pack.

SUMMARY OF THE INVENTION

In one example, a working machine is disclosed. The working machine includes an auxiliary system carried by the working machine, one or more batteries and an onboard thermal transfer system. The one or more batteries power an electrical system of the working machine. The onboard thermal transfer system utilizes a coolant configured to remove at least a portion of heat generated by the one or more batteries during charging or discharging of the one or more batteries and using the coolant heated by the thermal transfer system to heat the auxiliary system In another example, a method of transferring heat away from one or more batteries of a working machine during charging or discharging of the one or more batteries is disclosed. The method includes passing a coolant from a tank through a thermal transfer system in a heat exchange relationship with the one or more batteries, wherein the coolant receives at least a portion of the heat generated by the one or more batteries, wherein at least a portion of the thermal transfer system is onboard the working machine and transferring heat from the coolant heated by the one or more batteries from the thermal transfer system to one or more auxiliary systems of the working machine.

In another example, a system configured to transfer heat away from one or more batteries of a working machine during charging or discharging of the one or more batteries is disclosed. The system includes a working machine and a thermal transfer system. The working machine includes one or more batteries carried by the working machine, a machine electrical system and one or more auxiliary systems. The machine electrical system is connected to receive power from the one or more batteries. The one or more auxiliary systems are carried by the working machine. The thermal transfer system has at least a portion thereof onboard the working machine. The thermal transfer system has a coolant configured to remove at least a portion of heat generated by the one or more batteries during charging or discharging of the one or more batteries.

BRIEF DESCRIPTION OF THE DRAWINGS

FIG. 5 is a flow chart of a method of transferring heat from a battery according to an example of the present application.

DETAILED DESCRIPTION

Figure 1:
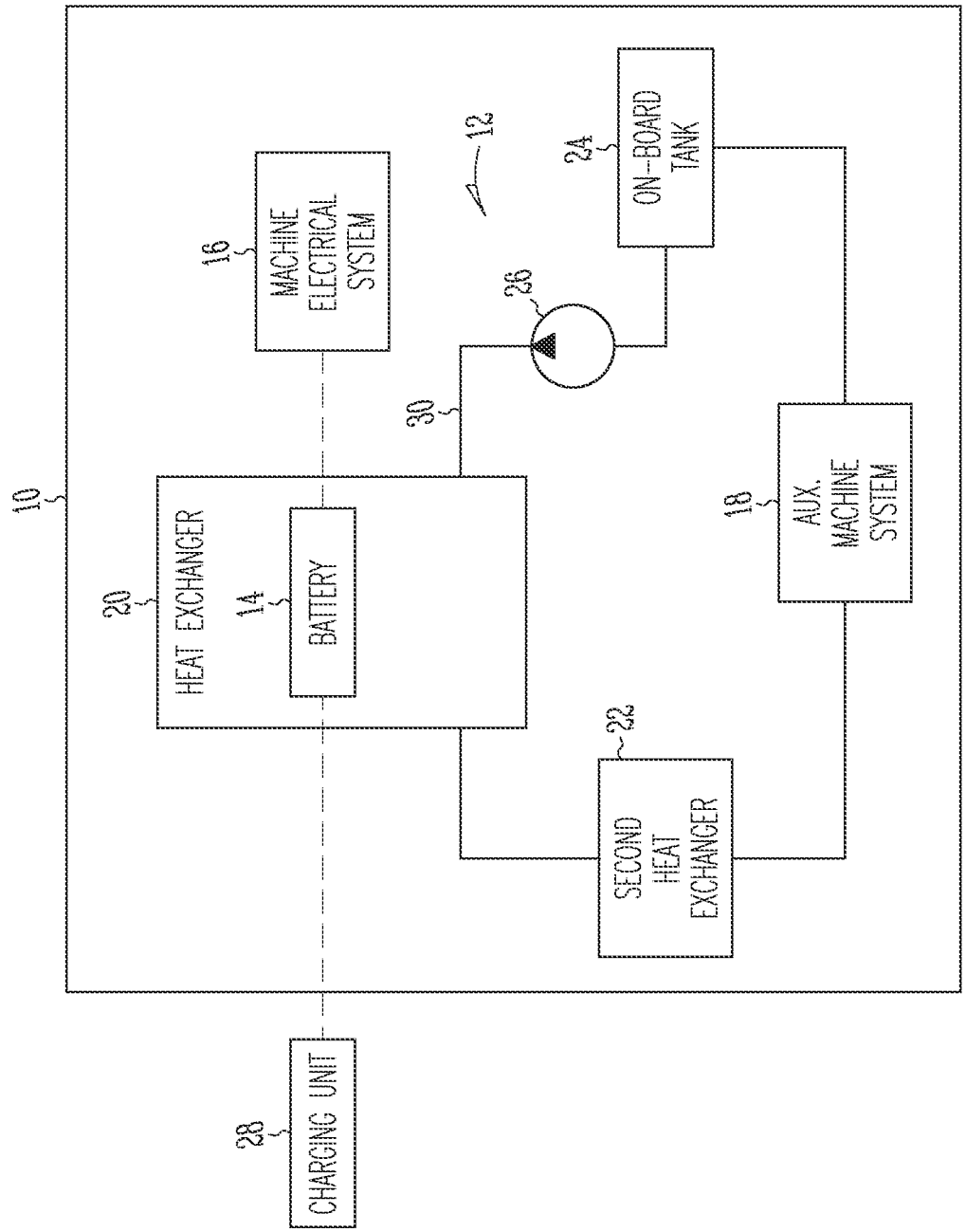
FIG. 1 is a highly schematic diagram illustrating a working machine having a thermal transfer system entirely onboard thereof according to an example of the present application.
Figure 2:
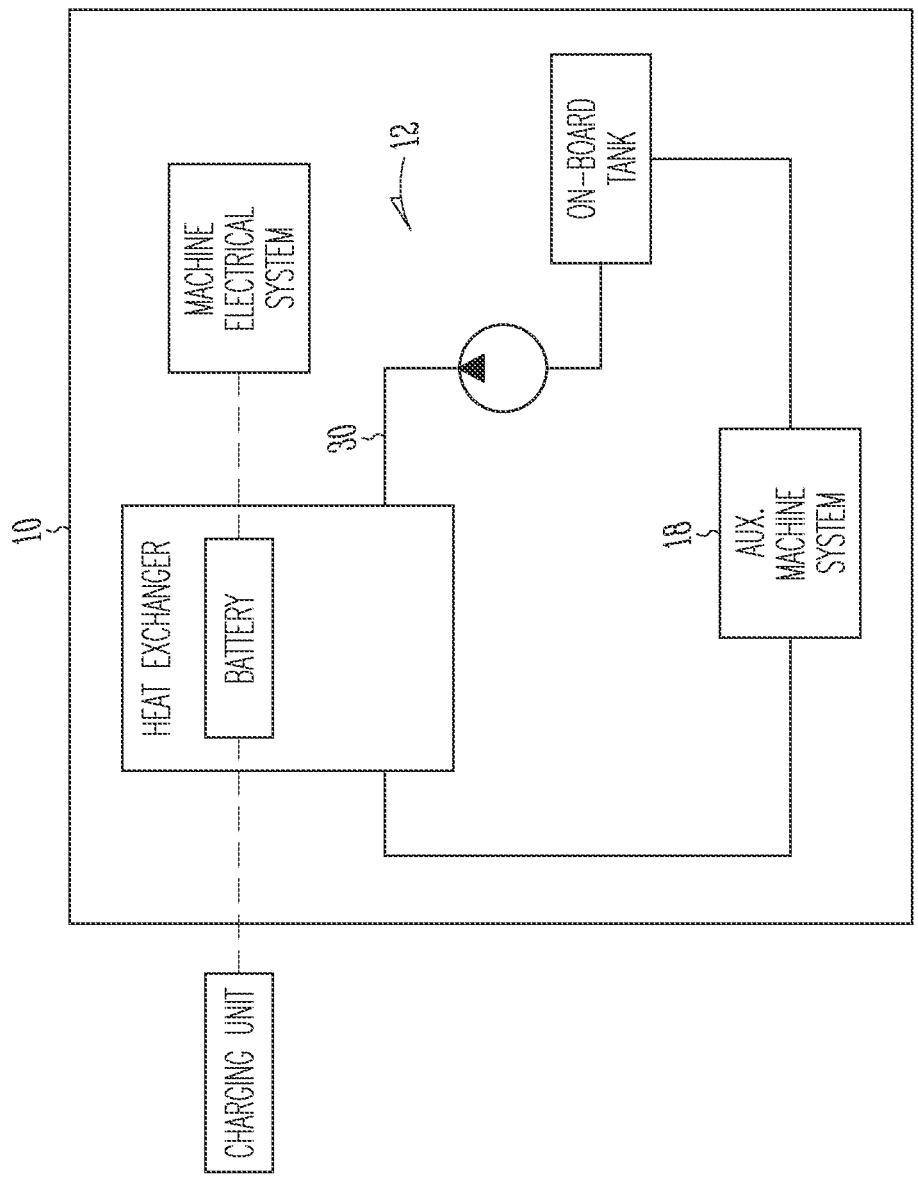
FIG. 2 is a highly schematic diagram illustrating the working machine with the thermal transfer system of FIG. 1 operating in a second mode according to a second example of the present application.
Figure 3:
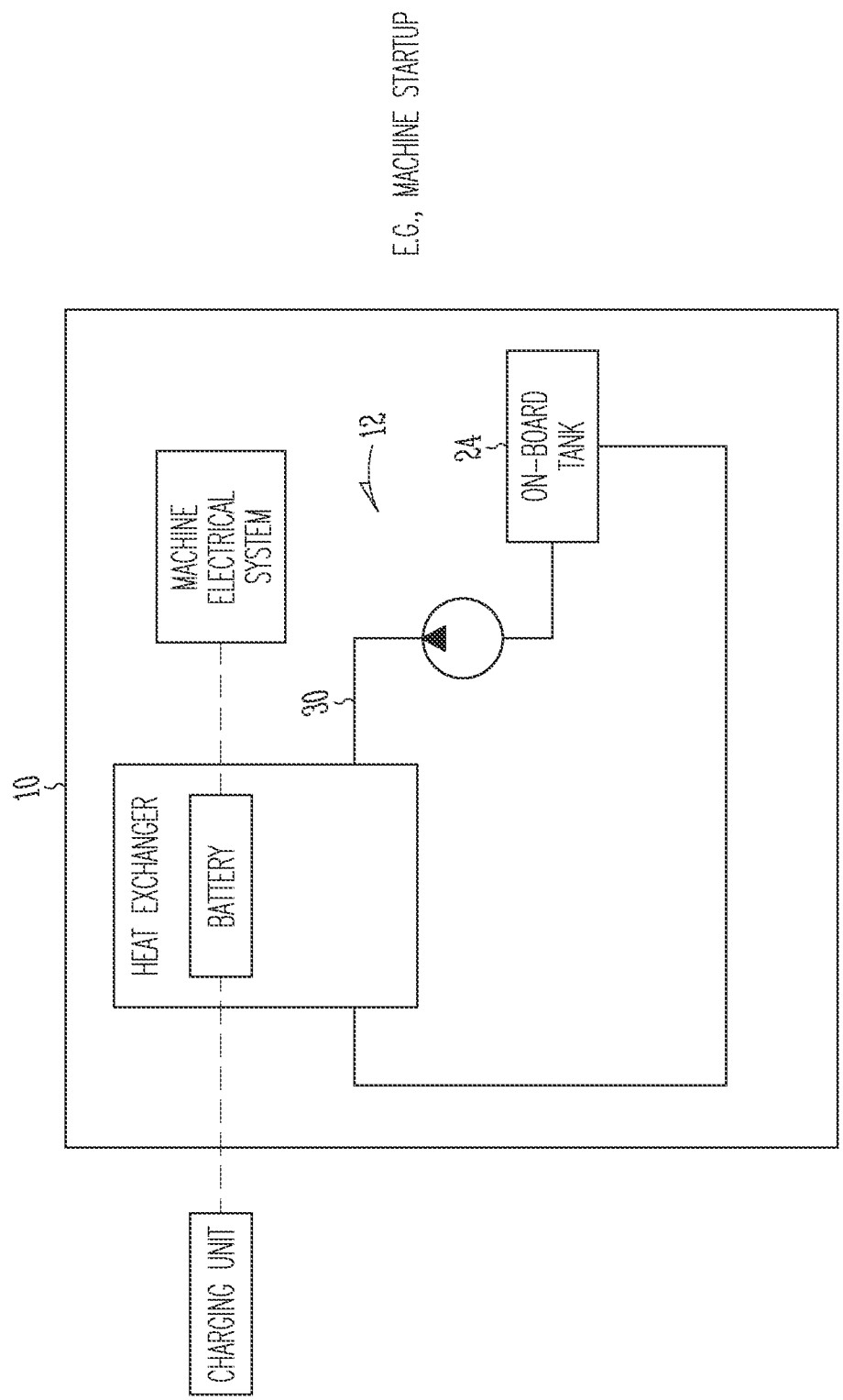
FIG. 3 is a highly schematic diagram illustrating the working machine with the thermal transfer system of FIG. 1 operating in a third mode according to a third example of the present application.

FIGS. 1-3 are block diagrams illustrating a working machine 10, such as a paving equipment, earth moving equipment, mining equipment, etc. FIGS. 1-3 show the working machine 10 having a thermal transfer system 12 with different operation modes. The thermal transfer system 12 can be located entirely onboard the working machine 10 and can utilize coolant native to the working machine 10. The techniques, systems and methods described herein are generally applicable to all working machines, including pavers, cold planer machines, compactors, rotary mixers, scrapers, dozers, excavators, material haulers, and other working machine types.

FIG. 1 is a schematic diagram illustrating the working machine 10 and components thereof including the thermal transfer system 12. The working machine 10 can include one or more batteries 14, a machine electrical system 16 and one or more auxiliary machine systems 18 in addition to the thermal transfer system 12. The thermal transfer system 12 can include a heat exchanger 20, a second heat exchanger 22, an onboard tank 24 and a pump 26.

Power for the working machine 10 may be generated using one or more power sources such as a prime mover, one or more backup power sources, and/or one or more external power sources. For example, the working machine 10 may include an internal combustion engine, such as a diesel engine, an electric motor powered by the one or more batteries 14, or another engine type. In an example, in the internal combustion engine may include one or more attached generators configured to convert mechanical energy from the engine into electrical energy for use by the machine electrical system 16. In other examples, the power for the machine 10 may be received from one more backup power sources including the one or more batteries 14, capacitors, external power sources, and the like in addition to, or in place of, the primary power source. It is further contemplated that the one or more batteries 14 can comprise the primary power source for the prime mover of the working machine 10 according to some examples. Although shown as electrically coupled to the machine electrical system 16 in FIG. 1, it should be understood the one or more batteries 14 can be coupled to other systems such as electric motor(s) or other systems not illustrated in FIG. 1.

Occasionally, the one or more batteries 14 can be recharged using a charging unit 28 as known in the art. The charging unit 28 can be located external to the one or more batteries 14 and the working machine 10 and can electrically couple thereto via cables, ports or other electrical transfer mechanisms as known in the art.

The one or more batteries 14 can be electrically coupled to one or more components of the working machine 10 including the machine electrical system 12. The machine electrical system 12 can include various devices including an Engine Control Module (ECM) associated with an engine, Implement Control Module (ICM) associated with implement, Transmission Control Module (TCM), and Brake Control Module. One or more of ECM, ICM, TCM and BCM can be communicatively connected and configured to send and receive data, sensor or other analog signals, and other information between the various units (sometimes simply termed electronic control units (ECUs)). These ECUs can be an embedded systems that control the machine electrical system 16 and/or other subsystems of the working machine 10.

The ECUs of the working machine 10 can include software, hardware, and combinations of hardware and software configured to execute a number of functions attributed to the components in the disclosed examples. The ECUs of the working machine 10 can be an analog, digital, or combination analog and digital controllers including a number of components. As examples, the ECUS of working machine 10 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECUs of the working machine 10 may include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECM, ICM, TCM and/or BCM.

The thermal transfer system 12 can include a coolant circuit 30 (e.g., lines, hoses, etc.) carrying a coolant. The coolant can be carried onboard the working machine 10 along with all other components of the thermal transfer system 12. The coolant can be used for other purposes by the one or more auxiliary machine systems 18 as further discussed herein.

The coolant can comprise, for example, water, anti-freeze mixed with water, glycol, glycol mixed with water, hydraulic fluid (e.g., oil) or cold air. According to one example, the coolant comprises water and the one or more auxiliary machine systems 18 comprise a water system of the working machine 10 including spray units configured to spray the water on a milling rotor such as is known on a cold planer or other milling machine. According to another example, the coolant comprises hydraulic fluid and the one or more auxiliary machine systems 18 comprise a hydraulic system of the working machine. Such hydraulic system can be used to move various components (e.g., raise and lower buckets, dump loads, raise or lower lift columns, raise or lower the milling rotor, etc.) as known in the art.

The coolant circuit 30 passes through the heat exchanger 20, the second heat exchanger 22, the onboard tank 24 and the pump 26. The heat exchanger 20 can comprise a liquid-to-liquid heat exchanger where the coolant receives heat from a second liquid, which can be a liquid of the one or more batteries 14 or a liquid circulated through, around and/or over the cells of the one or more one or more batteries 14, for example.

FIG. 1 shows operation of the working machine 10, and specifically the thermal transfer system 12, in a first mode where the coolant leaving the heat exchanger 20 is undesirably hot. Thus, it is desirable the coolant be cooled by the second heat exchanger 22 prior to passing to the one or more auxiliary machine systems 18. Such undesirable temperature of the coolant can result from rapid charging of the one or more batteries 14, load on the one or more batteries 14 from various systems or subsystem including some that are temporarily plugged into the working machine 10, or environmental factors (e.g., operating in a hot climate or on steep terrain).

The second heat exchanger 22 can comprise a liquid-to-liquid heat exchanger or a liquid-to-air heat exchanger, for example. For example, the second heat exchanger 22 can comprise a hydraulic fluid cooler (e.g., a radiator, a fan cooled unit, a water cooled unit, etc.) as known in the art.

Once the coolant is cooled to a desired temperature by the second heat exchanger 22 the coolant can pass to the one or more auxiliary machine systems 18 and then back to the onboard tank 24. The onboard tank 24 can be a dedicated tank for holding the coolant of the thermal transfer system 12 or can be a shared tank where the coolant is mixed with fluid of other of the auxiliary machine systems 18. For example, the onboard tank 24 can be a hydraulic reservoir used by the hydraulic system or can be a water tank used by the spraying system.

The pump 26 can circulate the coolant along the coolant circuit 30 from the onboard tank 24 to and through the heat exchanger 20, the second heat exchanger 22, and back to the onboard tank 24.

FIG. 2 shows a schematic diagram illustrating the working machine 10 as previously described in FIG. 1 with the thermal transfer system 12 operating in a second mode.

According to the second mode, the coolant circuit 30 can be modified from previously shown in FIG. 1 and can bypass the second heat exchanger 22 (FIG. 1) and flow directly to the one or more auxiliary machine systems 18. This flow path for the flow circuit 30 can be the result of the coolant of the thermal transfer system 12 being within an acceptable temperature range (e.g., between a higher threshold and a lower threshold) for use with the one or more auxiliary machine systems 18 such that cooling of the coolant by the second heat exchanger 22 (FIG. 1) need not be performed.

FIG. 3 shows a schematic diagram illustrating the working machine 10 as previously described in FIG. 1 with the thermal transfer system 12 operating according to third mode.

In the third mode of operation, the coolant circuit 30 can be modified from previously shown in FIGS. 1 and 2 and can bypass the second heat exchanger 22 (FIG. 1) and the one or more auxiliary machine systems 18 (FIGS. 1 and 2) and flow directly back to the onboard tank 24. This flow path for the flow circuit 30 can be the result of the coolant of the thermal transfer system 12 being below an acceptable temperature range (e.g., below the lower threshold) such that use with the one or more auxiliary machine systems 18 (FIGS. 1 and 2) is not desirable. The third mode of operation could be desirable in certain operation conditions (e.g., machine startup, cold climate battery charging, etc.) for the working machine 10.

Figure 4:
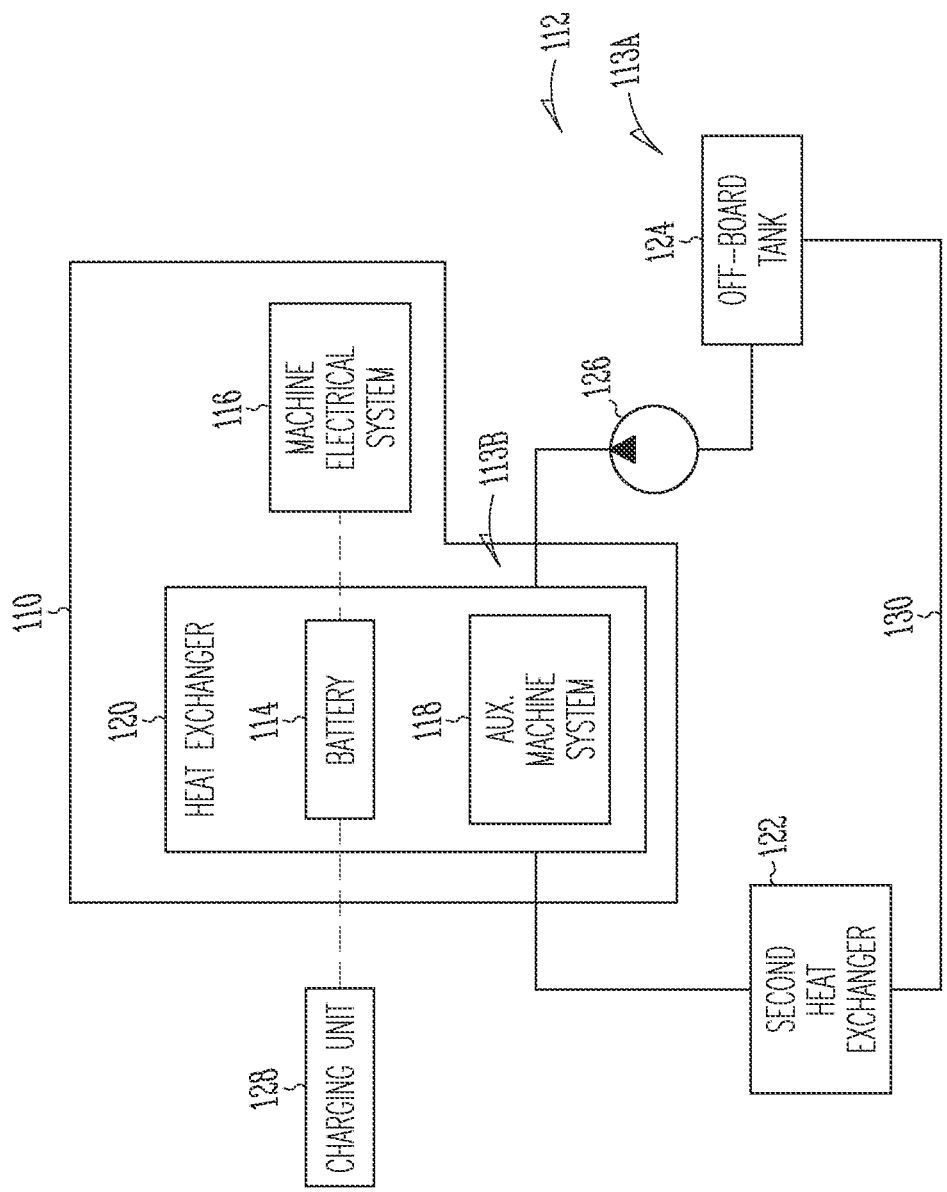
FIG. 4 is a highly schematic diagram illustrating another thermal transfer system with components thereof offboard the working machine according to another example of the present application.

FIG. 4 shows a schematic diagram of a working machine 110 and a thermal transfer system 112. The working machine 110 and the thermal transfer system 112 are modified from those previously discussed in FIGS. 1-3 in that at least a portion 113A of the thermal transfer system 112 is offboard the working machine 110. A second portion 113B of the thermal transfer system 112 can be onboard the working machine 110.

The working machine 110 can include one or more batteries 114, a machine electrical system 116 and one or more auxiliary machine systems 118 constructed in the manner of those previously discussed in regard to FIGS. 1-3. The thermal transfer system 112 can include a heat exchanger 120, a second heat exchanger 122, an offboard tank 124 and a pump 126. A charging unit 128 for recharging the one or more batteries 114 similar to the charging unit 28 of FIGS. 1-3 is also shown in FIG. 4.

The thermal transfer system 112 can include a coolant circuit 130 carrying a coolant (e.g., water, anti-freeze mixed with water, glycol, water-glycol, hydraulic fluid (e.g., oil), cold air, etc.). The coolant circuit 130 can include onboard machine portions and offboard portions.

The heat exchanger 120 can be the second portion 113B of the thermal transfer system 112 onboard the working machine 110. The heat exchanger 120 can comprise a liquid-to-liquid heat exchanger where the coolant receives heat from a second liquid, which can be a liquid of the one or more batteries 114 or a liquid circulated through, around and/or over the cells of the one or more one or more batteries 114, for example. Optionally, the coolant after receiving heat from the one or more batteries 114 can transfer heat via the heat exchanger 120 (or another heat exchanger) to the one or more auxiliary machine systems 118 onboard the working machine 110. For example, heated coolant after leaving the one or more batteries 114 in the heat exchanger 120 could be used to warm water for the spraying system onboard the working machine 110 and/or could be used to warm hydraulic fluid used by the hydraulic system onboard the working machine 110.

The heat exchanger 120 can couple with the remainder of the coolant circuit 130 (e.g., the portion 113A of the thermal transfer system 112 offboard) via a liquid transfer plug, fluid line connection or other mechanism known in the art. Upon leaving the heat exchanger 120 the heated coolant may pass to the second heat exchanger 122 for cooling. The second heat exchanger 122 can be offboard the working machine 110 and can be a liquid-to-liquid heat exchanger or a liquid-to-air heat exchanger, for example as previously discussed. Once the coolant is cooled to a desired temperature by the second heat exchanger 122 the coolant can pass to the offboard tank 124 (if a tank is needed). The pump 126 can circulate the coolant along the coolant circuit 130 from the offboard tank 124 through the connection to the working machine 110 (e.g., a liquid transfer plug) to and through the heat exchanger 120 onboard the working machine 110 and back offboard the working machine 110 (via a second connection) through the second heat exchanger 122 and back to the offboard tank 124.

FIG. 5 shows a method 200 of transferring heat away from one or more batteries of a working machine during charging or discharging of the one or more batteries. The method 200 can pass 202 a coolant from a tank through a thermal transfer system in a heat exchange relationship with the one or more batteries. The coolant can receive at least a portion of the heat generated by the one or more batteries. At least a portion of the thermal transfer system can be onboard the working machine. The method 200 can optionally transfer 204 heat from the coolant heated by the one or more batteries from the thermal transfer system to one or more auxiliary systems of the working machine.

As discussed previously, the one or more auxiliary systems can comprise an onboard hydraulic system or an onboard spray system of the working machine, for example. Thus, the coolant can be onboard hydraulic fluid carried the working machine or onboard water carried by the working machine according to some examples. In some operation modes, the coolant heated by the one or more batteries can bypass the one or more auxiliary systems or a second thermal transfer system. The thermal transfer system can include an onboard tank or reservoir for the coolant.

According to other examples, portions of the thermal transfer system can be offboard the working machine. Thus, for example, a portion of the thermal transfer system onboard the working machine is fluidly coupled with the second portion of the thermal transfer system offboard the working machine.

INDUSTRIAL APPLICABILITY

When a paving crew arrives at a work site the crew often starts various machines (e.g., a paving machine and/or a cold planer) to warm up onboard systems. While the machines are warming up, external components may be plugged in and/or swapped out for use during operation of the machine. This startup process can increase load on the batteries causing the batteries to generate more heat than would be desired. Other environmental factors (temperature, terrain) can also increase load on the batteries. The present application contemplates use of the various apparatuses, systems and methods to remove this heat from adjacent the batteries reducing the chances of damage to the cells of the batteries and increasing operational life of the batteries. The present application further contemplates optional use of the heat generated by the batteries by other auxiliary systems 18 onboard the working machine 10. For example, on board water used to cool the batteries could be heated to a desirable temperature thereby for use in a spraying system onboard the cold planer. As another example, hydraulic fluid used to cool the batteries could be heated to a desirable temperature for use on the onboard hydraulic system(s) of the working machine.

The above detailed description is intended to be illustrative, and not restrictive. The scope of the disclosure should, therefore, be determined with references to the appended claims, along with the full scope of equivalents to which such claims are entitled.

What is claimed is:

1. A working machine comprising:
an auxiliary system carried by the working machine;
one or more batteries powering an electrical system of the working machine; and an onboard thermal transfer system utilizing a coolant configured to remove at least a portion of heat generated by the one or more batteries during charging or discharging of the one or more batteries and using the coolant heated by the thermal transfer system to heat the auxiliary system, wherein, upon startup of the working machine, the coolant bypasses at least one of the auxiliary system or a second thermal transfer system.

2. The working machine of claim 1, wherein the auxiliary system comprises a hydraulic system of the working machine.

3. The working machine of claim 1, wherein the auxiliary system comprises a spray system having water for use in operation of the working machine.

4. The working machine of claim 1, wherein the coolant comprises at least one of an onboard hydraulic fluid of the working machine or onboard water of the working machine.

5. The working machine of claim 1, further comprising:
a second onboard thermal transfer system of the working machine configured to receive the coolant heated from the thermal transfer system and remove heat from the coolant;
an onboard tank of the working machine configured to receive the coolant after the coolant passes through the second thermal transfer system; and
a pump configured to circulate the coolant through the onboard thermal transfer system, the second onboard thermal transfer system and back to the tank.

6. A system configured to transfer heat away from one or more batteries of a working machine during charging or discharging of the one or more batteries, the system comprising:
a working machine comprising:
one or more batteries carried by the working machine;
a machine electrical system connected to receive power from the one or more batteries; and
one or more auxiliary systems carried by the working machine; and
a thermal transfer system having at least a portion thereof onboard the working machine, the thermal transfer system having a coolant configured to remove at least a portion of heat generated by the one or more batteries during charging or discharging of the one or more batteries, wherein, upon startup of the working machine, the coolant bypasses at least one of the one or more auxiliary systems or a second thermal transfer system.

7. The system of claim 6, wherein the one or more auxiliary systems comprise at least one of an onboard hydraulic system of the working machine or an onboard spray system of the working machine and the coolant comprises at least one of onboard hydraulic fluid carried the working machine or onboard water carried by the working machine.

8. The system of claim 6, wherein the one or more auxiliary systems of the working machine use the coolant heated by the thermal transfer system.

9. The system of claim 6, further comprising:
a second onboard thermal transfer system of the working machine configured to receive the coolant heated from the thermal transfer system and remove heat from the coolant;
an onboard tank of the working machine configured to receive the coolant after the coolant passes through the second thermal transfer system; and
a pump configured to circulate the coolant through the onboard thermal transfer system, the second onboard thermal transfer system and back to the tank.

10. The system of claim 6, wherein at least a second portion of the thermal transfer system is offboard the working machine, wherein the one or more auxiliary systems of the working machine are heated by the coolant of the thermal transfer system.

11. The system of claim 6, wherein at least a second portion of the thermal transfer system is offboard the working machine and further comprising:
a second offboard thermal transfer system configured to receive the coolant heated from the thermal transfer system and remove heat from the coolant;
an offboard tank configured to receive the coolant after the coolant passes through the second thermal transfer system; and
a pump configured to circulate the coolant through the thermal transfer system, the second portion of the thermal transfer system and back to the tank.

12. The system of claim 6, wherein the coolant comprises one of water or hydraulic fluid carried onboard the working machine and used by the one or more auxiliary systems.

13. A system configured to transfer heat away from one or more batteries of a working machine during charging or discharging of the one or more batteries, the system comprising:
a working machine comprising:
one or more batteries carried by the working machine;
a machine electrical system connected to receive power from the one or more batteries; and
one or more auxiliary systems carried by the working machine; and
a thermal transfer system having at least a portion thereof onboard the working machine, the thermal transfer system having a coolant configured to remove at least a portion of heat generated by the one or more batteries during charging or discharging of the one or more batteries, wherein, upon startup of the working machine, the coolant bypasses both the one or more auxiliary systems and a second thermal transfer system and flows to an onboard tank.

14. The system of claim 13, wherein the one or more auxiliary systems comprise at least one of an onboard hydraulic system of the working machine or an onboard spray system of the working machine and the coolant comprises at least one of onboard hydraulic fluid carried the working machine or onboard water carried by the working machine.

* * * * *